No. 712,103. Patented Oct. 28, 1902.
C. P. STEINMETZ.
POLYPHASE INDUCTION REGULATOR.
(Application filed Feb. 27, 1899.)
(No Model.)
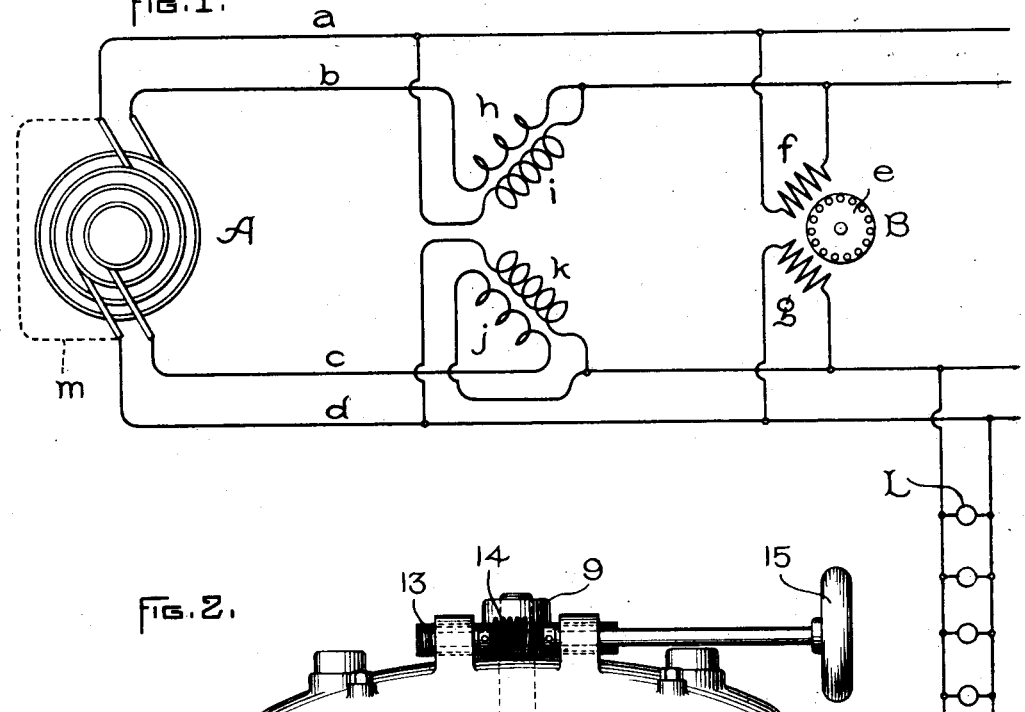
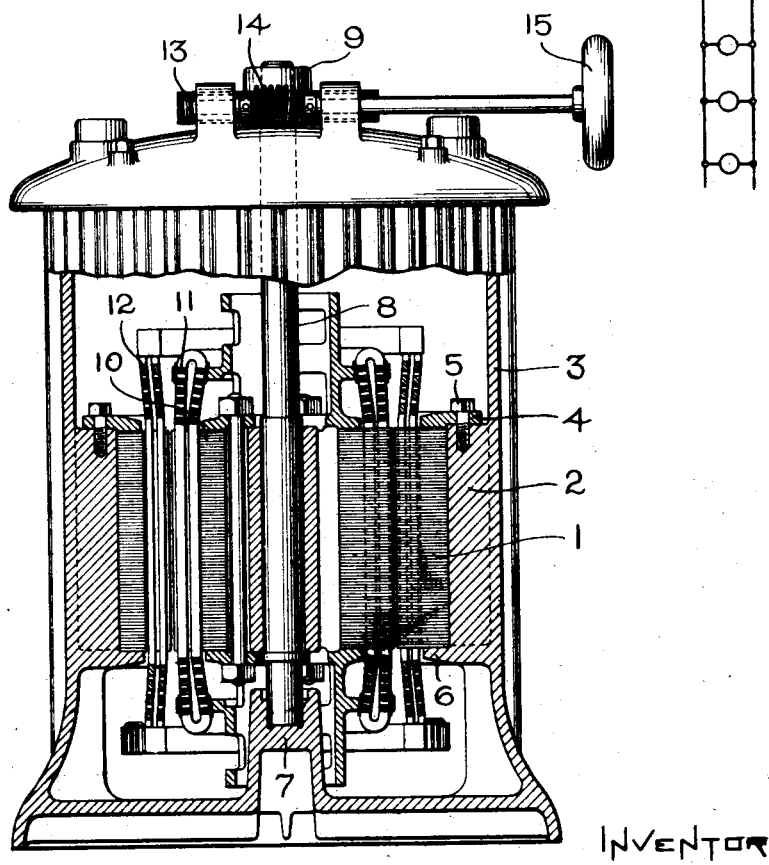
Witnesses.
A. H. Abell.
A. F. Macdonald.
Inventor.
Charles P. Steinmetz,
by Albert G. Davis.
Atty.

UNITED STATES PATENT OFFICE.

CHARLES P. STEINMETZ, OF SCHENECTADY, NEW YORK, ASSIGNOR TO THE GENERAL ELECTRIC COMPANY, A CORPORATION OF NEW YORK.

POLYPHASE INDUCTION-REGULATOR.

SPECIFICATION forming part of Letters Patent No. 712,103, dated October 28, 1902.

Application filed February 27, 1899. Serial No. 706,939. (No model.)

*To all whom it may concern:*

Be it known that I, CHARLES P. STEINMETZ, a citizen of the United States, residing at Schenectady, county of Schenectady, State of New York, have invented certain new and useful Improvements in Polyphase Induction-Regulators, (Case No. 926,) of which the following is a specification.

Where multiphase systems of electrical distribution are used for both lighting and power purposes, a serious difficulty which is encountered is that of unequal variations of electromotive force across different mains of the system, commonly known as "unbalancing," and caused in general by unequal distribution of load between different mains of the system. In some cases, however—as, for instance, in interconnected two-phase systems—if the loads are reactive or the transmission-lines contain reactance the electromotive forces across the two sides of the system become unequal, even if loads on the two sides of the system are equal.

The necessity for some means for bringing multiphase systems of distribution into balance is therefore apparent, and for this purpose I have devised an arrangement for simultaneously operating upon the electromotive forces between two sides of a multiphase system, the action being such as to produce an opposite variation in the electromotive forces, either raising one and simultaneously lowering the other, or the reverse.

My invention is more particularly applicable to two-phase systems of electric distribution; but it is not in any sense limited thereto, but may be applied to any two alternating-current circuits in which it is desired to produce simultaneously an opposite variation of electromotive forces.

The particular nature of my invention will be better understood by reference to the following description, taken in connection with the accompanying drawings, while its scope will be clearly and particularly pointed out in the appended claims.

Figure 1 illustrates diagrammatically the application of my invention to a two-phase system of electrical distribution. Fig. 2 shows a physical embodiment of my invention.

Referring to Fig. 1, A represents a source of two-phase currents of any appropriate character—such, for example, as a two-phase generator. In this case current of one phase is conducted over mains $a\ b$, while current of the other phase is conducted over independent mains $c\ d$. From these mains connections are made to translating devices in the usual way. At B, I have illustrated a two-phase motor having an induced member $e$, acted upon by currents in the coils $f\ g$ of the inducing member, one coil, as $f$, being supplied with current of one phase from the mains $a\ b$, while the other coil $g$ is supplied with current of the other phase from the mains $c\ d$. Lamps L are shown as connected across the mains $c\ d$.

The means which I have devised for bringing the electromotive forces on the two sides of the system to an equality when they become unbalanced consists of two coöperatively-arranged induction-regulators, one of which is applied to each side of the system. Each induction-regulator consists of a winding in series with one of the mains and a shunt-winding connected across the corresponding mains. As here shown, the winding $h$ of one regulator is connected in series with the main $b$, while its corresponding shunt-winding $i$ is connected across the mains $a\ b$. In a similar manner the winding $j$ of the other regulator is connected in series with one of the mains $c$ of the other side of the system, while its shunt-winding $k$ is connected across the mains $c\ d$.

Where I find it desirable, I may make each of these regulators self-contained and connect them together mechanically, so as to be simultaneously operated; but in most cases I prefer to place all of the windings of both regulators in a single structure having two relatively movable members. This structure is similar to an ordinary induction-motor and consists of a suitably-constructed toothed ring of laminated magnetic material, within which a similarly-toothed cylinder of laminated magnetic material is mounted so as to be partially rotatable. Over one member both of the series coils are mounted, while on the other member both of the shunt-coils are similarly mounted. The coils are so arranged that in one position of the regulator the lines of force produced by each shunt-coil will all pass through or tend to pass through the corresponding series coil. The electromotive force induced in each series coil by the action of its corresponding shunt-coil will thus be a maximum and will accordingly add to or cut down the electromotive force of the line a maximum amount, depending upon the direction in which the coils are connected into circuit. For the purpose of my present invention the coils operating upon one circuit are so connected as to have an effect opposite from that of the coils which act upon the other circuit. This reverse connection of the coils may be made in different ways, one manner of accomplishing the same being shown in Fig. 1.

With the connections of the regulator thus described and with the coils in the relative position to each other above mentioned it will be seen that one set of coils acts to raise the electromotive force of one circuit a maximum and to depress that of the other a maximum in the opposite direction. If now the shunt-coils be rotated or moved away from the corresponding series coils, the mutual induction between the coils becomes less, thus decreasing the boosting effect on one circuit and the lowering effect on the other. A continued relative movement of the coils finally results in bringing them into a neutral position, where no effect is produced on either circuit. A continued movement beyond this position causes a reverse action to take place, lowering the electromotive force of that circuit whose electromotive force had previously been raised and raising the electromotive force on that circuit whose electromotive force had been lowered.

It will thus be seen that my improved regulating device simultaneously raises one electromotive force and lowers another, thus providing a means for producing any desired relation between two electromotive forces without changing their mean value. It will be further observed that the action of my device is not dependent upon the current flowing in the two branches of the system and that it does not have as its object the equalization of current thus flowing, thus differing essentially from many devices for balancing multiphase systems, which depend for their operation upon unequality of current in the system.

A convenient form of apparatus in which I may embody my invention is shown in Fig. 2, the same being indicated partially in section. An annular structure 1, of laminated magnetic material, is here shown as carried by projections 2, formed integral with a suitable protecting-casing 3. A clamping-plate 4, secured by bolts 5, serves to press the laminated structure 1 against the projecting ledge 6. A boss 7 projects up from the bottom of the casing 3 and supports the lower end of a shaft 8, the upper end of which has a bearing in the cover-plate 9 of the casing 3. A laminated structure 10 of cylindrical form is carried by the shaft 8 and is similar to the rotating member of an inductor-motor. Each of the members 1 10 is provided with teeth, and in the slots between the teeth the coils of the respective members are carried. For convenience the shunt-coils are placed upon the rotatable member 10, while the series coils are placed on the fixed member 1. The shunt-coils are indicated in section at 11 and comprise a bundle of comparatively small conductors, while the series windings are shown in section at 12 and consist of wire or rod of large cross-section. The winding of the coils in the slots is similar to that of the ordinary induction-regulator now well known in the art and will be readily understood.

Any desired means may be provided for securing relative rotation between the two members of the regulator, and in the case shown in Fig. 2 I employ for this purpose a worm-wheel 13, secured to the end of the shaft 8, with the worm 14 coacting therewith. Rotation of the worm 14 may be produced by means of the hand-wheel 15, attached to the shaft.

I have illustrated one form which I consider useful for carrying out my invention; but it is evident that many variations of my invention may be made without departing from its spirit. Thus as a minor point I have in Fig. 1 shown my invention as applied to a two-phase system with independent circuits; but it will be obvious that it is equally as applicable to interconnected two-phase systems, and I therefore intend to indicate by the dotted line $m$ that two of the mains, such as $a\,d$, may be consolidated, so as to form a common return for the other two in a manner well understood.

Having thus described my invention, what I claim as new, and desire to secure by Letters Patent of the United States, is—

1. The method of equalizing the electromotive forces of two circuits, which consists in superposing at will upon one of the electromotive forces an electromotive force acting in conjunction therewith, superposing on the other electromotive force an electromotive force acting in opposition thereto, and simultaneously adjusting the electromotive forces thus superposed.

2. The method of equalizing the alternating electromotive forces of two circuits carrying currents differing in phase from each other, which consists in superposing on the electromotive force in one circuit an electromotive force acting in conjunction therewith, superposing on the electromotive force of the other circuit an electromotive force acting in opposition thereto, and simultaneously adjusting the electromotive forces thus superposed.

3. The method of regulating the electromotive forces of two electric circuits which consists in setting up at will by inductive action an electromotive force in one of the circuits in opposition to the electromotive force acting therein, simultaneously acting by induction to set up an electromotive force in the other circuit in conjunction with the electromotive force therein, and then simultaneously adjusting the resultant electromotive forces.

4. The method of regulating a two-phase system which consists in simultaneously and oppositely boosting the electromotive forces on two sides of the system independently of the amount of current flowing in the system.

5. The method of balancing a two-phase system of electrical distribution, which consists in boosting up the electromotive force of one side of the system and simultaneously boosting down the electromotive force of the other side of the system, until the electromotive forces become equal.

In witness whereof I have hereunto set my hand this 25th day of February, 1899.

CHARLES P. STEINMETZ.

Witnesses:
BENJAMIN B. HULL,
MABEL E. JACOBSON.